United States Patent
Sadeck

(10) Patent No.: US 7,448,577 B2
(45) Date of Patent: Nov. 11, 2008

(54) APPARATUS FOR PROVIDING VELOCITY DIFFERENTIAL BETWEEN PARACHUTE AND PAYLOAD TO REDUCE SHOCK LOAD

(75) Inventor: James Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 291 days.

(21) Appl. No.: 11/217,848

(22) Filed: Aug. 23, 2005

(65) Prior Publication Data

US 2007/0257155 A1 Nov. 8, 2007

(51) Int. Cl.
B64D 17/00 (2006.01)

(52) U.S. Cl. .............. 244/142; 244/152; 244/137.3; 244/147; 244/151 B; 188/375

(58) Field of Classification Search .......... 244/142, 244/152, 137.3, 147, 151 B; 188/371, 375, 188/376
See application file for complete search history.

(56) References Cited

U.S. PATENT DOCUMENTS

| | | | | |
|---|---|---|---|---|
| 2,352,036 | A | | 6/1944 | Tauty |
| 2,474,124 | A | * | 6/1949 | Schultz ............ 244/151 R |
| 2,613,865 | A | | 10/1952 | Rose |
| 3,334,847 | A | * | 8/1967 | Axenborg ......... 244/122 A |
| 3,444,957 | A | | 5/1969 | Ervin |
| 3,563,498 | A | * | 2/1971 | Haile ............... 244/122 R |
| 3,694,028 | A | | 9/1972 | Andres |
| 3,804,698 | A | | 4/1974 | Kinloch |
| 4,446,944 | A | | 5/1984 | Forrest |
| 4,538,702 | A | * | 9/1985 | Wolner ................ 182/3 |
| 5,174,410 | A | | 12/1992 | Casebolt |
| 5,393,016 | A | * | 2/1995 | Howard et al. ...... 244/138 R |
| 6,085,802 | A | | 7/2000 | Silberberg |
| 6,279,680 | B1 | | 8/2001 | Casebolt |
| 6,533,066 | B1 | | 3/2003 | O'Dell |

* cited by examiner

Primary Examiner—Michael R Mansen
Assistant Examiner—Philip J Bonzell
(74) Attorney, Agent, or Firm—Vincent J. Ranucci

(57) ABSTRACT

An apparatus for dissipating shock load in a parachute delivery system has at least one strip of material having a first end, a second end opposite the first end, and a predetermined length. The apparatus also has a piercing member having a first portion for piercing through the strip of material and a second portion that defines an opening. The strip of material passes through the opening in the piercing member. The first end of the strip of material is configured to be attached to parachute suspension lines. In a preferred embodiment, the strip of material is a strip of woven webbing. When a predetermined tensile force acts upon the strip of material and the piercing member such that the first end of the strip of woven webbing is pulled in one direction and the piercing member is pulled in an opposite direction, tension is produced which causes the piercing member to stretch and break the lateral fibers of the strip of woven webbing. In one embodiment, the apparatus includes a lanyard that has a first end attached to the piercing member and a second end adapted for attachment to a payload.

2 Claims, 5 Drawing Sheets

US 7,448,577 B2

APPARATUS FOR PROVIDING VELOCITY DIFFERENTIAL BETWEEN PARACHUTE AND PAYLOAD TO REDUCE SHOCK LOAD

STATEMENT OF GOVERNMENT INTEREST

The invention described herein may be manufactured and used by the U.S. Government for Governmental purposes without the payment of any royalties thereon.

BACKGROUND OF THE INVENTION

1. Field of the Invention

The present invention generally relates to an apparatus for dissipating the shock and related forces that occur during parachute opening.

2. Description of the Related Art

When a parachute completely opens during descent, shock loads are produced due to the weight of the payload attached to the suspension lines of the parachute. If large enough, such shock loads can rip or tear the parachute or parts thereof causing a catastrophic failure of the parachute system. Furthermore, if the payload consists of a person, that person could suffer severe injuries as a result of relatively large shock loads.

What is needed is an apparatus for use with a parachute that can safely dissipate the energy of a shock load that occurs when the parachute opens.

SUMMARY OF THE INVENTION

In one aspect, the present invention is directed to an apparatus for providing a velocity differential between a parachute and a payload to reduce shock load. In one embodiment, apparatus comprises at least one strip of material having a first end, a second end opposite the first end, and a predetermined length. The apparatus further comprises a piercing member having a first portion for piercing the strip of material and a second portion that defines an opening. The strip of material passes through the opening in the piercing member. The apparatus further comprises a device adapted for attaching the first end of the strip of material to the parachute suspension lines. When a predetermined tensile force acts upon the strip of material and the piercing member such that the first end of the strip of material is pulled in one direction and the piercing member is pulled in an opposite direction, tension is produced which causes the piercing member to longitudinally tear through at least a portion of the predetermined length of the strip of material.

In a related aspect, the present invention is directed to an apparatus for providing a velocity differential between a parachute and a payload to reduce shock load. In one embodiment, apparatus comprises at least one strip of material having a first end, a second end opposite the first end, and a predetermined length. The apparatus further comprises a piercing member having a first portion that is pierced through the strip of material and a second portion that defines an opening. The strip of material passes through the opening in the piercing member. The apparatus further comprises a device adapted for attaching the first end of the strip of material to the parachute suspension lines. When a predetermined tensile force acts upon the strip of material and the piercing member such that the first end of the strip of material is pulled in one direction and the piercing member is pulled in an opposite direction, tension is produced which causes the piercing member to longitudinally tear through at least a portion of the predetermined length of the strip of material.

In another aspect, the present invention is directed to a parachute delivery system, comprising a parachute having a canopy, suspension lines that extend from the canopy, and at least one strip of woven webbing. The strip of woven webbing has a first end, a second end opposite the first end, a predetermined length, a plurality of lateral fibers throughout substantially the entire length of the strip of woven webbing, and a plurality of longitudinal fibers extending for substantially the entire predetermined length of the strip of woven webbing. The parachute delivery system further comprises a device for attaching the first end of the strip of woven webbing to the parachute suspension lines. The parachute delivery system further comprises a piercing member which has a first portion that is pierced through the strip of woven webbing and a second portion that defines an opening. The strip of woven webbing passes through the opening in the piercing member. The parachute delivery system includes a lanyard having a first end attached to the piercing member and a second end adapted for attachment to a payload. When a predetermined tensile force acts upon the strip of woven webbing and the piercing member such that the first end of the strip of woven webbing is pulled in one direction and the piercing member is pulled in an opposite direction, tension is produced which causes the piercing member to stretch and break the lateral fibers of the strip of woven webbing.

Other objects, features and advantages of the present invention will be apparent from the ensuing description.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1:
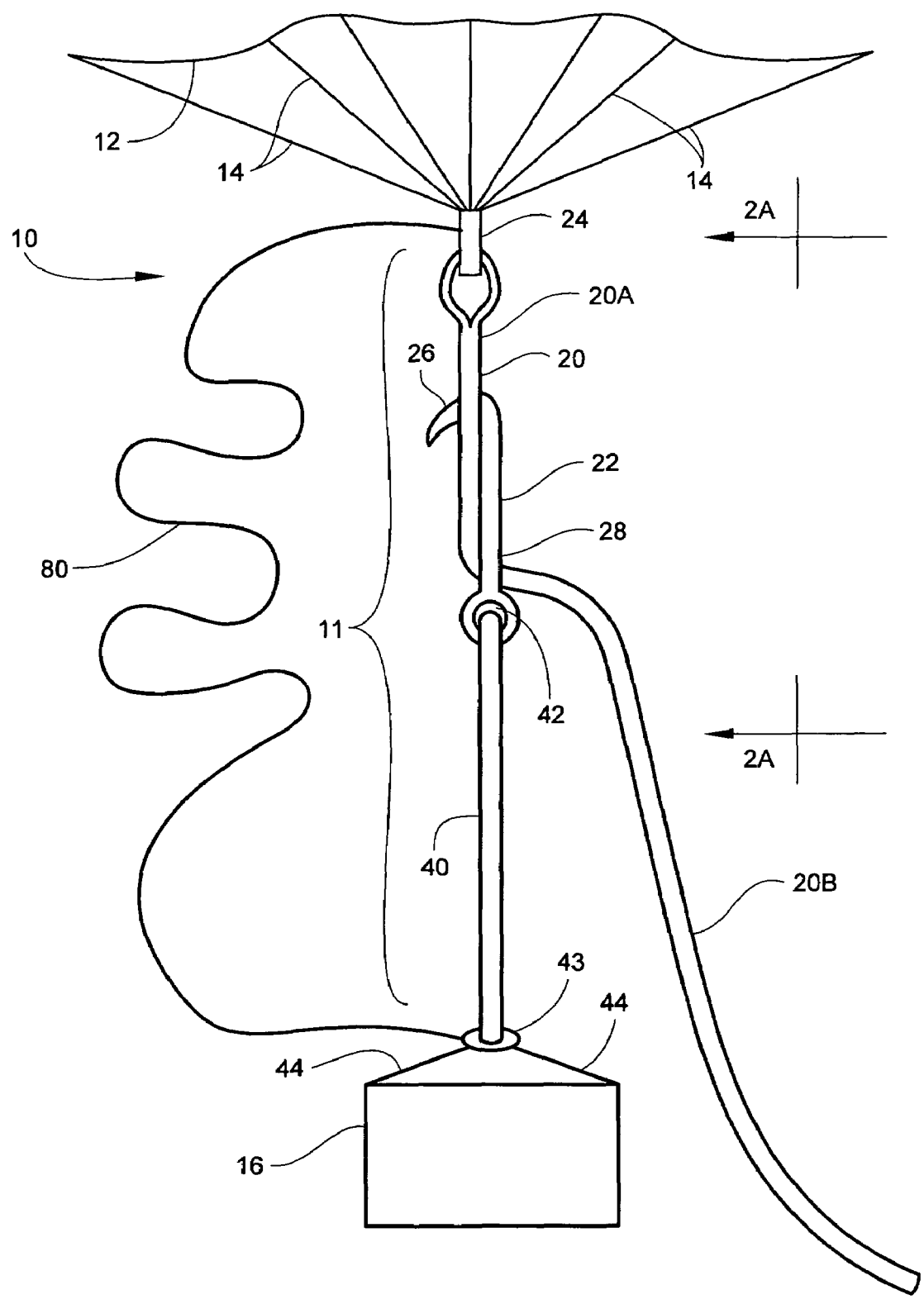
FIG. 1 is a side elevational view of a parachute delivery system that uses the apparatus of the present invention.

Referring to FIG. 1, there is shown parachute delivery system 10 which utilizes apparatus 11 of the present invention. Parachute delivery system 10 includes canopy 12 and suspension lines 14. The function of parachute delivery system 10 is to safely deliver payload or cargo 16. Apparatus 11 generally comprises strip of material 20, piercing member 22 and ring or loop 24. In one embodiment, piercing member 22 comprises a rip hook. Strip of material 20 has an upper portion 20A and lower portion 20B. Strip of material 20 and suspension lines 14 are attached to ring or loop 24. In one embodiment, ring 24 is fabricated from metal. In another embodiment, ring or loop 24 is fabricated from the same material used to fabricate suspension lines 14. Other suitable devices can be used to attach strip of material 20 to suspension lines.

Figure 2A:
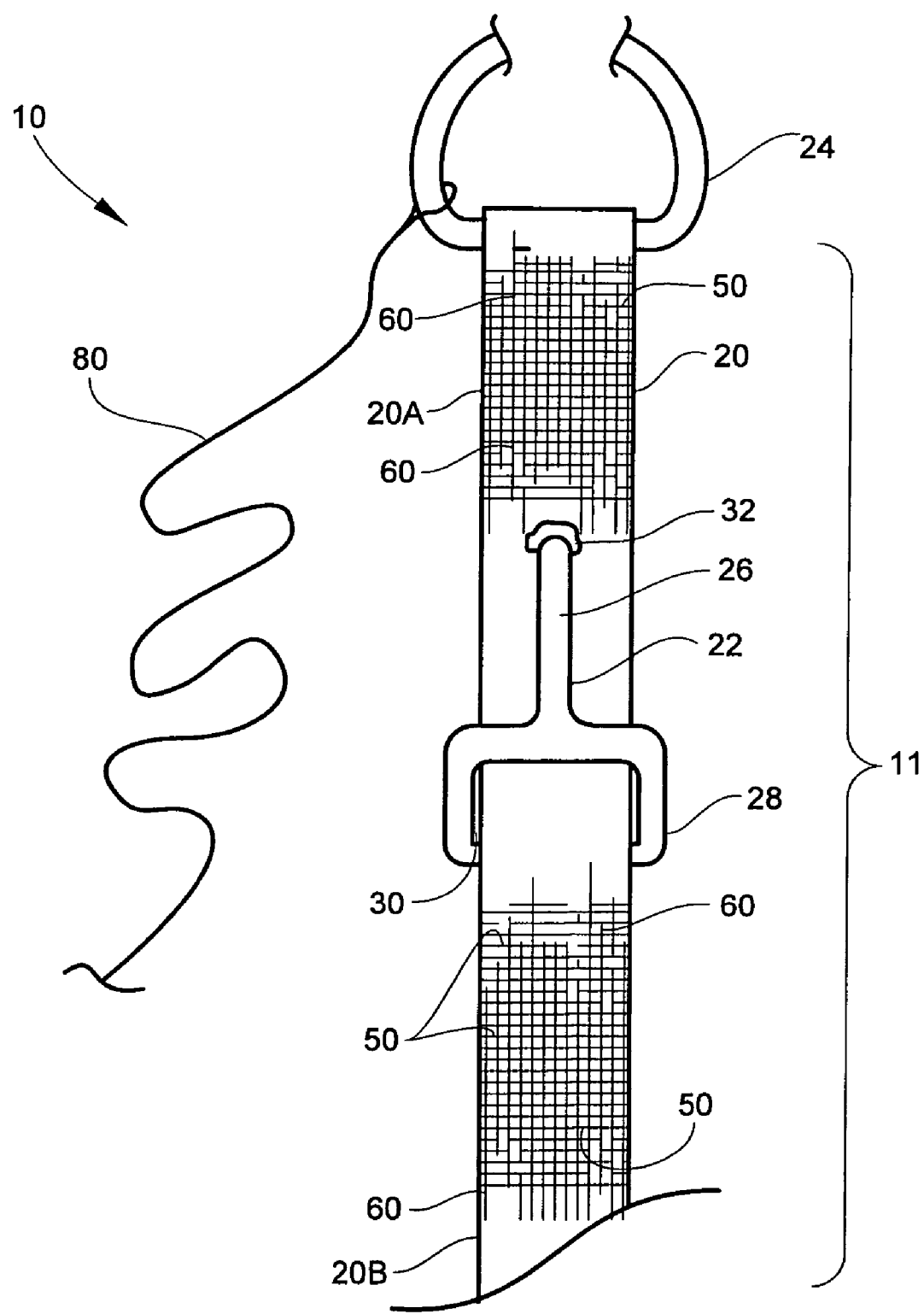
FIG. 2A is a view of the apparatus of the present invention taken along line 2A-2A in FIG. 1.

Referring to FIGS. 1 and 2A, piercing member 22 has top portion 26 and bottom portion 28. Bottom portion 28 defines through-hole 30 through which strip of material 20 passes. In a preferred embodiment, top portion 26 is pierced into a starter-hole (not shown) in strip of material 20 during the assembly of apparatus 11. Piercing the strip of material 20 with top portion 26 increases the size of the starter-hole so as to form relatively larger opening 32.

Referring to FIG. 1, apparatus 11 includes lanyard 40 that has one end attached to piercing member 22. Piercing member 22 includes through-hole 42 through which lanyard 40 passes. Lanyard 40 has an opposite end that is attached to ring or loop 43. Tie lines 44 are attached to and between ring or loop 43 and payload 16. In an alternate embodiment, other suitable devices can be used to implement the function of lanyard 40.

Figure 2B:
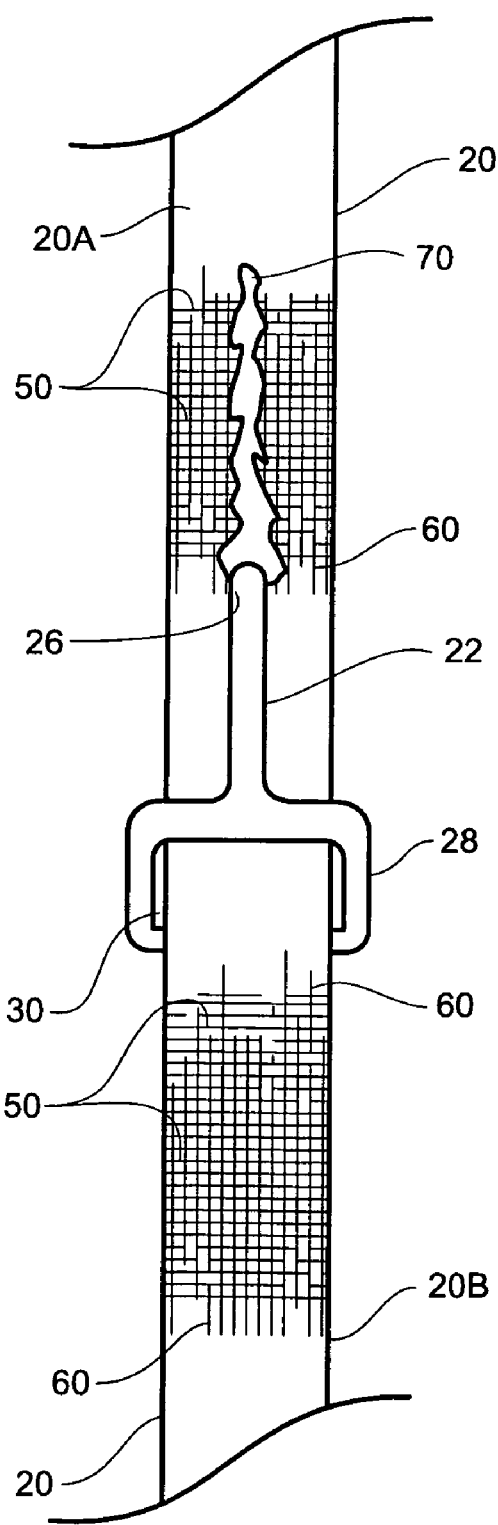
FIG. 2B is a partial, front view of the apparatus of the invention, similar to the view of FIG. 2A, showing the piercing member tearing the latitudinal fibers of the strip of woven webbing.

Referring to FIGS. 2A and 2B, strip of material 20 is preferably fabricated from fibers or fill yarns of woven webbing. For purposes of example, the ensuing description is in terms of strip of material 20 being configured as a strip of woven webbing. Specifically, the strip of woven webbing has latitudinal or lateral fibers 50 and longitudinal fibers 60. For purposes of simplicity, fibers 50 and 60 are partially shown in FIGS. 2A and 2B. When parachute delivery system 10 and payload 16 are released or dropped from an aircraft, parachute delivery system 10 accelerates due to gravity. Upon initial disreefing, the inflation of the parachute canopy 12 and the accelerating payload 16 cooperate to produce a tensile force on apparatus 11. Specifically, the gravitational force produced by payload 16 causes a downward force, and the disreefing of the canopy 12 causes an opposite, upward force. Thus, device 24 is pulled upward in one direction and piercing member 22 is pulled downward in an opposite direction. This tensile force causes top portion 26 of piercing member 22 to begin ripping or breaking the lateral fill yarns or fibers 50 of strip of woven webbing 20 causing slit 70. This ripping or breaking process continues as piercing member 22 moves downward along the length of strip of woven webbing 20. As a result of the aforesaid ripping or breaking process, opening 32 in strip of woven webbing 20 (see FIG. 2A) merges into slit 70 (see FIG. 2B). The passage of strip of woven webbing 20 through opening 30 in bottom portion 28 of piercing member 22 controls and insures continuous breaking or ripping of the lateral fill yarns 50 in strip of woven webbing 20. As piercing member 22 moves downward upon the strip of woven webbing 20, the energy of falling payload 16 is dissipated through the heat and drag produced by piercing member 22. As a result, falling payload 16 decelerates without a single shock or repeated shocks to payload 16.

The actual length of the strip of woven webbing 20 depends on the deceleration force produced by its fill yarns and/or the strength of the individual fill yarns. In order to reduce the length of the strip of woven webbing 20 and yet produce a relatively larger deceleration force, woven webbing 20 is fabricated from relatively higher strength woven webbing.

In an alternate embodiment, strip of material 20 comprises a woven tape. Other suitable materials can be used to realize strip of material 20.

In an alternate embodiment, parachute delivery system 10 further includes stop line 80 which controls the distance piercing member 22 moves along strip of woven webbing 20. Stop line 80 is attached to and between rings 24 and 42. The length of stop line 80 is shorter than the length of the strip of woven webbing 20 so as to prevent piercing member 22 from completely tearing or ripping its way through the entire length of strip of woven webbing 20. Thus, when all shock load energy is dissipated, payload 16 is actually carried by stop line 80 and the remaining portion of the strip of woven webbing 20 that was not ripped by piercing member 22.

Although the foregoing description is in terms of apparatus 11 being configured so that top portion 26 of piercing member 22 is pre-pierced through strip of material 20, it is to be understood that apparatus 11 can be configured so that top portion 26 is not pre-pierced through strip of material 20. In such a configuration, the user of the parachute system will pierce strip of material 20 with top portion 26 during the process of packing the parachute system.

Figure 3:
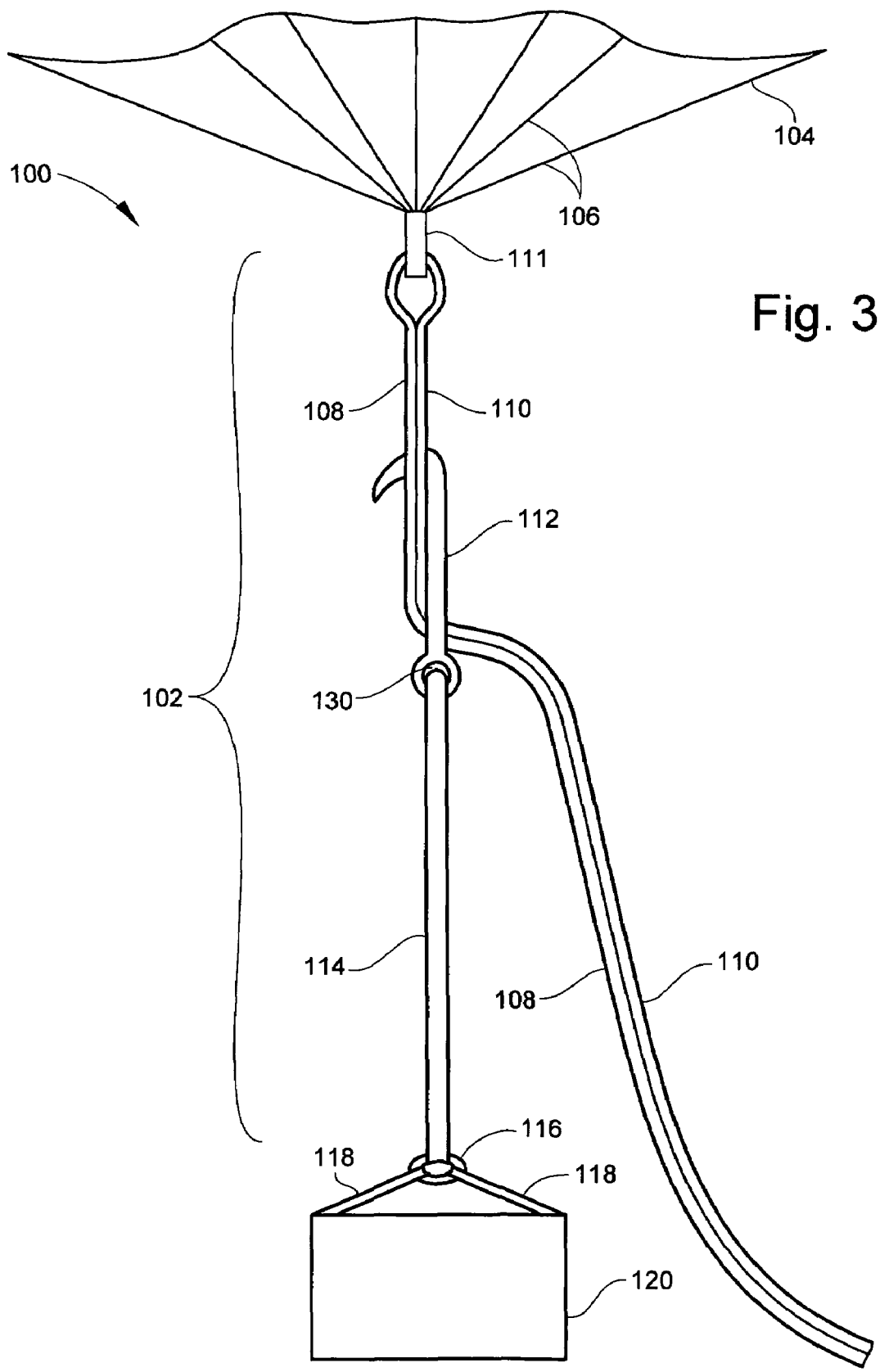
FIG. 3 is a side elevational view of a parachute delivery system that uses an alternate embodiment of the apparatus of the present invention.

Referring to FIG. 3, there is shown parachute system 100 that uses apparatus 102 in accordance with another embodiment of the present invention. Parachute delivery system 100 comprises canopy 104 and suspension lines 106. Apparatus 102 generally comprises strips of material 108 and 110 that are attached together in an overlapping relationship. Strips of material 108 and 110 are attached to suspension lines 106 via ring or loop 111. In a preferred embodiment, strips of material 108 and 110 are fabricated from woven webbing as described in the foregoing description. In one embodiment, strips of material 108 and 110 are stitched together. However, other suitable techniques may be used to attach strips of woven webbing material 108 and 110 together. Apparatus 102 further comprises piercing member 112. Piercing member 112 has generally the same structure as piercing member 22 (see FIGS. 1, 2A and 2B) and generally functions in the same manner as piercing member 22. Piercing member 112 has an opening (not shown) that is similar to opening 30 in piercing member 22 (see FIG. 2A) through which both strips of woven webbing 108 and 110 pass. Piercing member 112 is pierced through both strips of woven webbing 108 and 110. Apparatus 100 also includes lanyard 114 that has one end attached to piercing member 112 and an opposite end attached to load 120. Specifically, one end of lanyard 114 passes through through-hole 130 in piercing member 112. The other end of lanyard 114 is attached to ring or loop 116. Tie lines 118 are attached to and between ring or loop 116 and payload 120. Since two strips of material 108 and 110 are used, the length of the strips of material 108 and 110 do not have to be long as the length of strip of material 20 shown in FIG. 1. Deceleration begins when piercing member 112 and lanyard 114 are placed in tension by parachute canopy 104 and accelerating load 120. Specifically, piercing member 112 begins ripping or breaking the horizontal or lateral fill yarns of strips of woven webbing 108 and 110. This ripping or breaking process continues as piercing member 112 moves downward along the length of strips of woven webbing material 108 and 110. As piercing member 112 moves downward, the energy of falling load 120 is dissipated through the heat and drag produced by piercing member 112 as it tears its way through strips of woven webbing 108 and 110. As a result, falling load 120 decelerates without a single shock or repeated shocks to load 120. The rate of dissipation of the energy depends upon the particular structure and strength of each strip of woven webbing 108 and 110.

Figure 4:
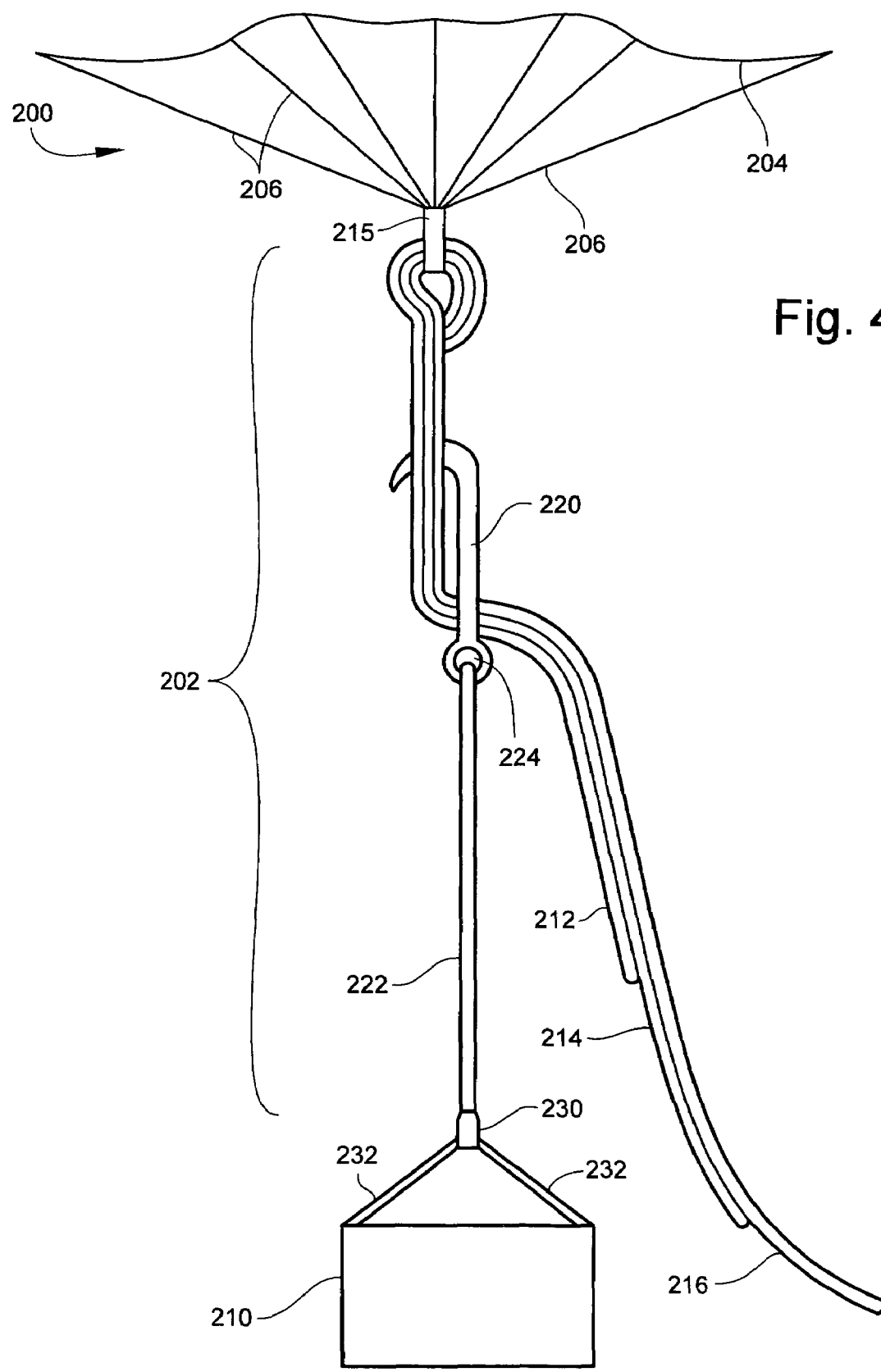
FIG. 4 is a side elevational view of a parachute delivery system that uses a further embodiment of the present invention.

Referring to FIG. 4, there is shown a further embodiment of the present invention. Parachute delivery system 200 uses apparatus 202 in accordance with a further embodiment of the present invention. Parachute delivery system 200 includes canopy 204 and suspension lines 206. In accordance with this embodiment, apparatus 202 functions to force payload 210 to maintain specific velocity decay. Apparatus 202 generally comprises strips of material 212, 214 and 216 that are attached together and arranged in a layered relationship. Strips of material 212, 214 and 216 are attached together. In one embodiment, stitching is used to attach strips of material 212, 214 and 216 together. However, other suitable techniques can be used to attach strips of material 212, 214 and 216 together. Strips of material 212, 214 and 216 have progressively longer lengths. For example, the length of strip of material 212 is less than the length of strip of material 214 and the length of the strip of material 214 is less than the strip of material 216. The upper ends of strips of material 212, 214 and 216 are attached to parachute suspension lines 206 via ring or loop 215. In a preferred embodiment, each strip of material 212, 214 and 216 are fabricated from woven webbing as described in the foregoing description. Apparatus 202 further comprises piercing member 220. Piercing member 220 has the same structure as piercing member 22 (see FIGS. 1, 2A and 2B) and generally functions in the same manner as piercing member 22. Piercing member 220 has an opening (not shown) that is similar to opening 30 in piercing member 22 (see FIG. 2A) through which all strips of woven webbing 212, 214 and 216 pass. Piercing member 220 is pierced through all three strips of woven webbing material 212, 214 and 216. Apparatus 200 also includes lanyard 222. Lanyard 222 has one end attached to piercing member 220 at through-hole 224. Lanyard 222 has an opposite end attached to payload 210 via ring or loop 230. Tie lines 232 are attached to and between ring or loop 230 and payload 210. Deceleration begins when piercing member 220 and lanyard 222 are placed in tension by accelerating payload 210. Specifically, piercing member 220 begins ripping or breaking the horizontal or lateral fill yarns of strips of woven webbing 212, 214 and 216. This ripping or breaking process continues as piercing member 220 moves downward along the length of strips of woven webbing 212, 214 and 216. As piercing member 220 moves downward, the energy of falling payload 210 is dissipated through the heat and drag produced by piercing member 220. As a result, falling payload 210 decelerates without a single shock or repeated shocks thereto. The rate of dissipation of the aforesaid energy depends upon the particular structure and strength of the strips of woven webbing 212, 214 and 216.

In an alternate embodiment, connecting devices such as rings or loops 24, 111 and 215 are not used. Instead, the end or ends of the strips of woven webbing are knotted to the parachute suspension lines.

A plurality of apparatuses 11, 102 or 202 may be used if a parachute delivery system is to deliver a very heavy load. For example, a pair of apparatuses 11 may be used in parallel in order to provide a velocity differential between the parachute and a heavy payload in order to substantially dissipate or minimize the effects of shock load.

Thus, the apparatus of the present invention safely provides a velocity differential between a parachute and a payload so as to substantially dissipate or minimize the effects of shock load.

Although the present invention has been described as being configured for use in a parachute delivery system, it is to be understood that the apparatus of the present invention can be used in other systems or situations wherein a payload is dropped or released from an elevation and shock load dissipation is needed.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not limiting the scope and spirit of the invention as set forth in the attached claims.

What is claimed is:

1. An apparatus for providing a velocity differential between a parachute and a payload, said payload consisting of cargo having a weight capable of producing a shock load for tearing the parachute when the parachute opens during decent, said velocity differential for reducing the shock load, comprising:

a parachute having a canopy and suspension lines that extend from the canopy to distal ends;

at least one strip of material having a first end, a second end opposite said first end, and a predetermined length, the predetermined length depending on a deceleration force, produced by the material, and strength of the material, such that a higher strength material produces a larger deceleration force and requires a reduced length of the strip of material;

a piercing member having a first portion for piercing through said at least one strip of material and a second portion that defines an enclosed first opening and an enclosed second opening, said enclosed first opening being a through-hole through which said at least one strip of material passes, whereby passage of said at least one strip of material through said enclosed first opening of said piercing member controls and insures continuous tearing of the strip of material in a downward direction, so that energy of descending cargo is dissipated through heat and drag produced by the piercing member, and said enclosed second opening being a through-hole;

means, comprising a ring, for attaching the first end of said at least one strip of material to the distal ends of the suspension lines;

a lanyard having a first end attached to said enclosed second opening of said second portion of said piercing member, and a second end adapted for attachment to the cargo; and a stop line for controlling a distance the piercing member moves downward the strip of material, said stop line being attached to and between said ring and said cargo, said stop line having a length shorter than the predetermined length of said strip of material for preventing the piercing member from completely tearing through an entire length of the strip of material, such that, upon all energy of descending cargo being dissipated, said cargo is carried by said stop line and any remaining non-torn portion of said strip of material; and whereby when a tensile force is applied to said apparatus such that said first end of said at least one strip of material is pulled in one direction and said piercing member is pulled in an opposite direction, tension is produced which causes said piercing member to longitudinally tear through at least a portion of said predetermined length of said at least one strip of material.

2. The apparatus according to claim 1 wherein said at least one strip of material comprises a plurality of strips of material attached together in a layered arrangement, wherein each strip of material of said plurality of strips of material has a different length.

* * * * *